United States Patent
Boisson et al.

(10) Patent No.: US 10,475,163 B2
(45) Date of Patent: Nov. 12, 2019

(54) METHOD AND APPARATUS FOR GENERATING DATA REPRESENTATIVE OF A BOKEH ASSOCIATED TO LIGHT-FIELD DATA

(71) Applicant: INTERDIGITAL CE PATENT HOLDINGS, Paris (FR)

(72) Inventors: Guillaume Boisson, Pleumeleuc (FR); Laurent Blonde, Thorigné-Fouillard (FR); Benoit Vandame, Betton (FR)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 0 days.

(21) Appl. No.: 15/683,207

(22) Filed: Aug. 22, 2017

(65) Prior Publication Data

US 2018/0061016 A1   Mar. 1, 2018

(30) Foreign Application Priority Data

Aug. 25, 2016 (EP) .................................... 16306082

(51) Int. Cl.
   *G06T 5/00* (2006.01)
   *G06T 7/557* (2017.01)
   *H04N 13/232* (2018.01)

(52) U.S. Cl.
   CPC .............. *G06T 5/002* (2013.01); *G06T 7/557* (2017.01); *G06T 2207/10052* (2013.01)

(58) Field of Classification Search
   None
   See application file for complete search history.

(56) References Cited

U.S. PATENT DOCUMENTS

| | | | |
|---|---|---|---|
| 8,514,491 B2 | 8/2013 | Duparre | |
| 8,988,317 B1* | 3/2015 | Liang | G06T 15/00 345/32 |
| 9,189,882 B2 | 11/2015 | Lee et al. | |
| 9,900,510 B1* | 2/2018 | Karafin | H04N 5/23267 |
| 10,122,994 B2* | 11/2018 | Yucer | G06T 7/564 |
| 2012/0044400 A1* | 2/2012 | Okada | H04N 5/23212 348/333.01 |
| 2013/0155065 A1 | 6/2013 | Bleiweiss | |
| 2013/0215108 A1 | 8/2013 | McMahon et al. | |

(Continued)

OTHER PUBLICATIONS

Munkberg, Jacob, et al., "Layered Reconstruction for Defocus and Motion Blur", EGSR 2014, pp. 1-12 (Year: 2014).*

(Continued)

*Primary Examiner* — Andrae S Allison
(74) *Attorney, Agent, or Firm* — Lily Neff

(57) ABSTRACT

There are several types of plenoptic devices having a proprietary file format. At present, there is no standard supporting the acquisition and transmission of multi-dimensional information for an exhaustive over-view of the different parameters upon which a light-field depends. As such, acquired light-field data for different cameras have a diversity of formats. The notion of pixel beam, which represents a volume occupied by a set of rays of light in an object space of an optical system of a camera is introduced. The method according to the invention enables to provide data representative of a bokeh associated to a pixel beam. Such data representative of bokeh associated to a pixel beam enables the displaying of an image with good bokeh properties.

13 Claims, 6 Drawing Sheets

(56) References Cited

U.S. PATENT DOCUMENTS

| | | | |
|---|---|---|---|
| 2013/0222633 A1* | 8/2013 | Knight | H04N 5/23212 348/222.1 |
| 2014/0003732 A1* | 1/2014 | Le Floch | G06T 9/007 382/233 |
| 2014/0063234 A1* | 3/2014 | Nobayashi | H04N 7/18 348/135 |
| 2014/0176540 A1* | 6/2014 | Tosic | G06T 17/00 345/420 |
| 2015/0319374 A1* | 11/2015 | Matsuoka | H04N 5/23212 348/239 |
| 2016/0021298 A1* | 1/2016 | Tsutsumi | G06T 7/593 348/349 |
| 2016/0191910 A1 | 6/2016 | Von Und Zu Liechtenstein | |
| 2016/0261809 A1* | 9/2016 | Namboodiri | H04N 5/349 |
| 2017/0013248 A1* | 1/2017 | Sato | H04N 5/23235 |

OTHER PUBLICATIONS

Uliyar et al., "Pixel Resolution Plenoptic Disparity Using Cost Aggregation", 2014 IEEE International Conference on Image Processing (ICIP), Paris, France, Oct. 27, 2014, pp. 3847-3851.
Wilburn et al., "High Performance Imaging Using Large Camera Arrays", ACM Transactions on Graphics (TOG), Proceedings of ACM SIGGRAPH 2005, vol. 24, No. 3, Jul. 2005, pp. 765-776.

\* cited by examiner

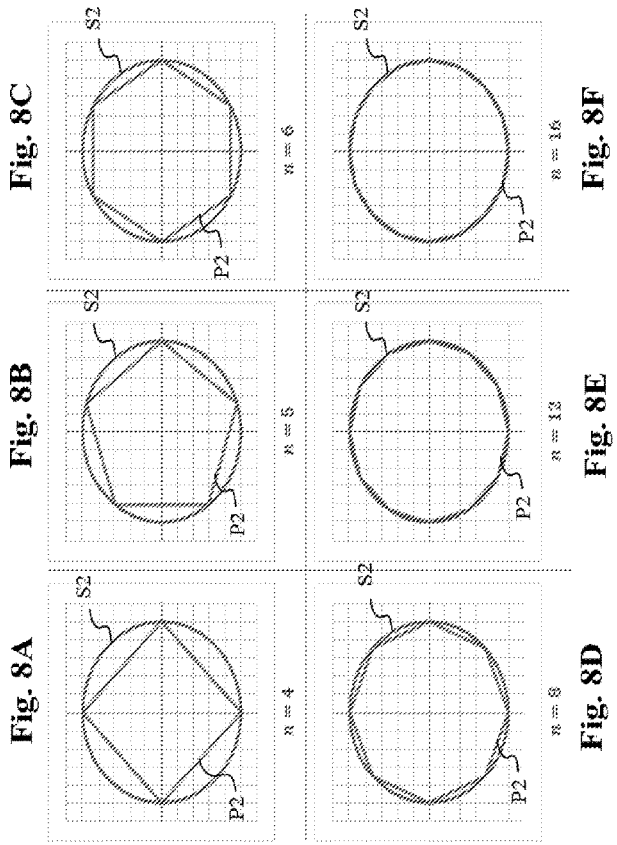
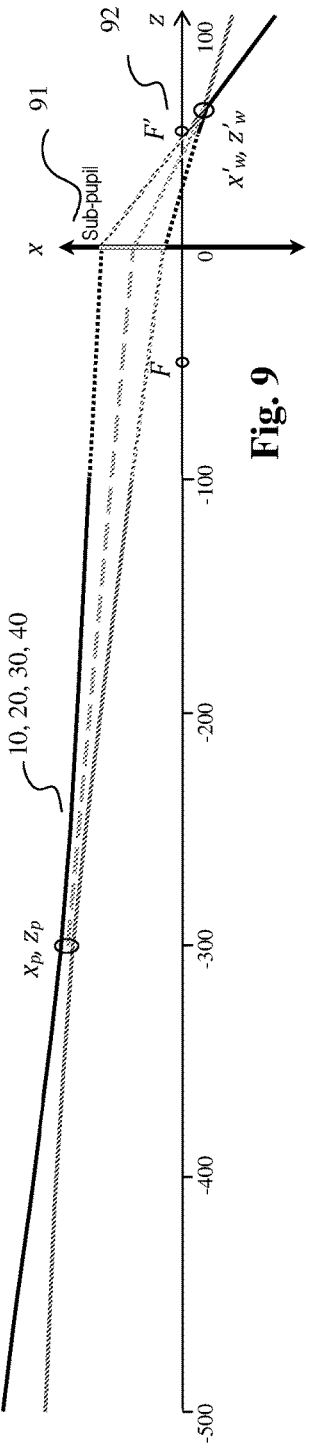

METHOD AND APPARATUS FOR GENERATING DATA REPRESENTATIVE OF A BOKEH ASSOCIATED TO LIGHT-FIELD DATA

REFERENCE TO RELATED EUROPEAN APPLICATION

This application claims priority from European No. 16306082.5, entitled "METHOD AND APPARATUS FOR GENERATING DATA REPRESENTATIVE OF A BOKEH ASSOCIATED TO LIGHT-FIELD DATA," filed on Aug. 25, 2016, the contents of which are hereby incorporated by reference in its entirety.

TECHNICAL FIELD

The invention lies in the field of plenoptic imaging and relates to a technique for generating bokeh information associated to a light field content.

BACKGROUND

Image acquisition devices project a three-dimensional scene onto a two-dimensional sensor. During operation, a conventional capture device captures a two-dimensional (2-D) image of the scene representing an amount of light that reaches a photosensor (or photodetector or photosite) within the device. However, this 2-D image contains no information about the directional distribution of the light rays that reach the photosensor, which may be referred to as the light-field. Depth, for example, is lost during the acquisition. Thus, a conventional capture device does not store most of the information about the light distribution from the scene.

Light-field capture devices, also referred to as "light-field data acquisition devices", have been designed to measure a four-dimensional (4D) light-field of the scene by capturing the light from different viewpoints of that scene. Thus, by measuring the amount of light traveling along each beam of light that intersects the photosensor, these devices can capture additional optical information, in particular information about the directional distribution of the bundle of light rays, for providing new imaging applications by post-processing. The information acquired/obtained by a light-field capture device is referred to as the light-field data. Light-field capture devices are defined herein as any devices that are capable of capturing light-field data. There are several types of light-field capture devices, among which:
  plenoptic devices, which use a microlens array placed between the image sensor and the main lens, as described in document US 2013/0222633;
  a camera array, as described by Wilburn et al. in "High performance imaging using large camera arrays." ACM Transactions on Graphics (TOG) 24, no. 3 (2005): 765-776 and in patent document U.S. Pat. No. 8,514,491 B2.

Light-field data processing comprises notably, but is not limited to, generating refocused images of a scene, generating perspective views of a scene, generating depth maps of a scene, generating extended depth of field (EDOF) images, generating stereoscopic images, and/or any combination of these.

Images or videos acquired by light-field acquisition devices may need to be transmitted to other devices, for example to display devices.

When the user wants to display the light-field content on its display device, he/she may select different portions of the content to bring different portions of the content into focus and out of focus. The focus plane is set at the desired depth, and the depth data is used to refocus the portions of the image selected by the user.

However, the picture synthesized accordingly may lack realism and aesthetic quality. Actually, out-of-focus parts of an image produced by a lens are blurred. The aesthetic quality of such a blur is called bokeh, which may be defined as "the way the lens renders out-of-focus points of light". Differences in lens aberrations and aperture shape cause some lens designs to blur the image in a way that is pleasing to the eye, while others produce blurring that is unpleasant or distracting.

When rendering an image or a video from a light-field content, it would be interesting to display an image as close as possible as a conventional image or video in terms of blur aesthetics, i.e. to display an image with good bokeh properties.

It would hence be desirable to provide a technique for encoding and decoding a signal representative of a light-field content, which would be appropriate to the specificities of light-field imaging, and which would allow realistic and/or aesthetic rendering of image or video contents.

The present invention has been devised with the foregoing in mind.

SUMMARY OF INVENTION

According to a first aspect of the invention there is provided a computer implemented method for generating data representative of a bokeh associated to a volume in an object space of an optical system occupied by a set of rays of light passing through a pupil of said optical system and a conjugate, in said object space of the optical system, of at least one pixel of a sensor associated to said optical system, said volume occupied by said set of rays of light being called a pixel beam, comprising:
  generating data representative of the bokeh associated to the pixel beam by computing a convex envelope of a set of intersections, with a first surface, of rays joining vertices of a first polygon representing a sampling of a section of the pixel beam to vertices of a second polygon representing a sampling of the pupil.

Such a method enables to convey a synthetic bokeh shape associated to a given pixel beam. An advantage of such a method is that it preserves the geometry of the underlying physics. The method according to an embodiment of the invention is fast and presents the advantage of intrinsically conveying a bokeh shape throughout an imaging workflow of a light filed content represented by a collection of pixel beams.

Another advantage of the method according to an embodiment of the invention is that such a method is generic since it relies on the use of polygons.

According to an embodiment of the method for generating data representative of a bokeh, the section of the pixel beam corresponds to the conjugate of a pixel of the sensor, the pupil corresponds to an entrance pupil of the optical system and the first surface corresponds to a focus plane of said optical system.

This corresponds to synthetic imaging. In this embodiment of the method according to the invention, the pixel beam is an object pixel beam which is located in the object space of the optical system.

According to an embodiment of the method for generating data representative of a bokeh, the section of the pixel beam corresponds to a conjugate, through another optical system, of an intersection of said pixel beam with a plane, the pupil corresponds to an exit pupil of the optical system and the first surface corresponds to the sensor associated to the optical system.

In this embodiment of the method according to the invention, the pixel beam is an image pixel beam which is located in the image space of the optical system.

According to an embodiment of the method for generating data representative of a bokeh, the first polygon comprising p vertices and the second polygon comprising n vertices, the number of rays joining the p vertices of the first polygon to the n vertices of the second polygon is a multiple of the product of n by p.

It appears that the complexity of the solution according to an embodiment of the invention increases linearly with the numbers of vertices of the first and the second polygons. Multiples of four are preferred for p and n for alignment issues in memory units during processing.

In the case of pixel beams located in the object space of the optical system, the bokeh obtained according to an embodiment of the invention corresponds to the convex envelope of p multiplied by n points.

In the case of pixel beams located in the image space of the optical system, or image pixel beams; and more specifically in the case where the pixel beam corresponds to a union of two overlapping cones, the obtained bokeh shape corresponds to the convex envelope of n multiplied by 2p points. In this case, each set of p points corresponds to an image of a sampled ellipse by a point of the pupil.

Another object of the invention is an apparatus for generating data representative of a bokeh associated to a volume in an object space of an optical system occupied by a set of rays of light passing through a pupil of said optical system and a conjugate, in said object space of the optical system, of at least one pixel of a sensor associated to said optical system, said volume occupied by said set of rays of light being called a pixel beam, said apparatus comprising a processor configured to:

generate data representative of the bokeh associated to the pixel beam by computing a convex envelope of a set of intersections, with a first surface, of rays joining vertices of a first polygon representing a sampling of a section of the pixel beam to vertices of a second polygon representing a sampling of the pupil.

According to an embodiment of the apparatus for generating data representative of a bokeh, the section of the pixel beam corresponds to the conjugate of a pixel of the sensor, the pupil corresponds to an entrance pupil of the optical system and the first surface corresponds to a focus plane of said optical system.

According to an embodiment of the apparatus for generating data representative of a bokeh, the section of the pixel beam corresponds to a conjugate, through another optical system, of an intersection of said pixel beam with a plane, the pupil corresponds to an exit pupil of the optical system and the first surface corresponds to a the sensor associated to the optical system.

According to an embodiment of the apparatus for generating data representative of a bokeh, the first polygon comprising p vertices and the second polygon comprising n vertices, the number of rays joining the p vertices of the first polygon to the n vertices of the second polygon is a multiple of the product of n by p.

Another object of the invention concerns a device for rendering a bokeh associated to associated to a volume in an object space of an optical system occupied by a set of rays of light passing through a pupil of said optical system and a conjugate, in said object space of the optical system, of at least one pixel of a sensor associated to said optical system, said volume occupied by said set of rays of light being called a pixel beam using obtained in accordance with the method of according to embodiments of the invention.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 8A-8F represent sections of a pixel beam sampled by polygons according to another embodiment of the invention, and FIG. 9 represents a pixel beam imaged through a second optical system according to an embodiment of the invention.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

For any optical acquisition system, may it be plenoptic or not, in addition to raw images or epipolar images representing 4D light-field data captured by the optical acquisition system, it is interesting to obtain information related to a correspondence between pixels of a sensor of said optical acquisition system and an object space of said optical acquisition system. Knowing which portion of the object space of an optical acquisition system a pixel belonging to the sensor of said optical acquisition system is sensing enables the improvement of signal processing operations such as de-multiplexing, de-mosaicking, refocusing, etc., and the mixing of images captured by different optical systems with different characteristics. Furthermore, information related to the correspondence between the pixels of the sensor of the optical acquisition system and the object space of said optical acquisition system are independent of the optical acquisition system.

Figure 1:
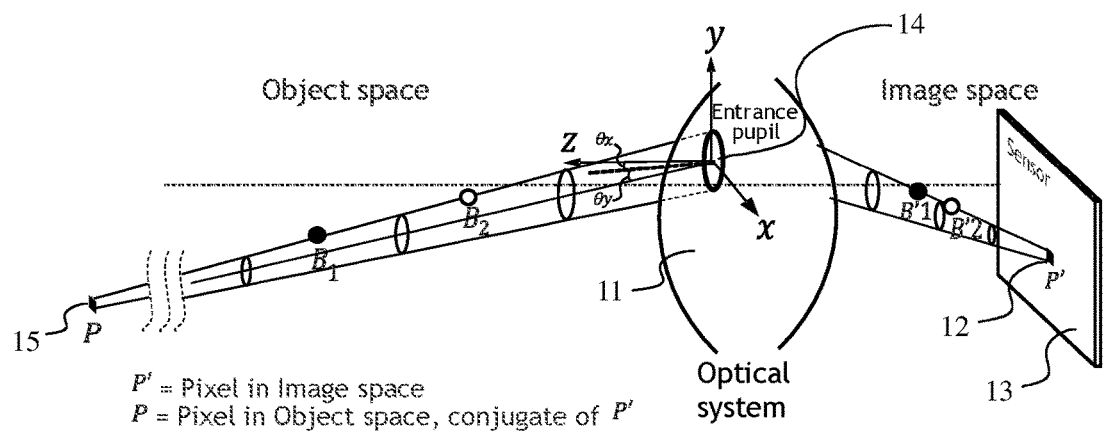
FIG. 1 shows a volume occupied by a set of rays of light passing through a pupil of an optical system of a camera.

The present disclosure introduces the notion of pixel beam 10, shown on FIG. 1, which represents a volume occupied by a set of rays of light passing through a pupil of an optical system 11 of a camera (not shown on FIG. 1) and a conjugate of a pixel of a sensor of the camera in an object space of the optical system in a direction normal to a surface of the pupil The set of rays of light is sensed by a pixel 12 of a sensor 13 of the camera through a pupil 14 of said optical system 11. The optical system 11 may be a combination of lenses fit for photo or video cameras. A pupil of an optical system is defined as the image of an aperture stop as seen through said optical system, i.e. the lenses of the optical acquisition system, which precedes said aperture stop. An aperture stop is an opening which limits the amount of light which passes through the optical system of the optical acquisition system. For example, an adjustable blade diaphragm located inside a camera lens is the aperture stop for the lens. The amount of light admitted through the diaphragm is controlled by the diameter of the diaphragm opening which may adapted depending of the amount of light a user of the camera wishes to admit. For example, making the aperture smaller reduces the amount of light admitted through the diaphragm, and, simultaneously, increases the depth of focus. The apparent size of a stop may be larger or smaller than its physical size because of the refractive action of a portion of the lens. Formally, a pupil is the image of the aperture stop through all lenses of the optical acquisition system located between the physical stop and the observation space.

A pixel beam 10 is defined as a pencil of rays of light that reach a given pixel 12 when propagating through the optical system 11 via an entrance pupil 14. As light travels on straight lines in free space, the shape of such a pixel beam 10 can be defined by two sections, one being the conjugate 15 of the pixel 12, and the other being the entrance pupil 14. The pixel 12 is defined by its non-null surface and its sensitivity map.

Figure 2:
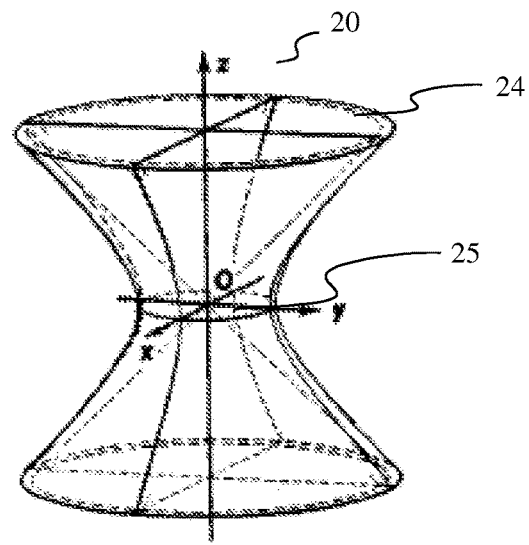
FIG. 2 shows a hyperboloid of one sheet representing a pixel beam according to an embodiment of the invention.

In a first embodiment of the invention, a pixel beam 30 may be represented by an hyperboloid of one sheet, as shown on FIG. 2, supported by two elements: the pupil 24 and the conjugate 25 of the pixel 12 in the object space.

A hyperboloid of one sheet is a ruled surface that can support the notion of pencil of rays of light and is compatible with the notion of "étendue" of physical light beams, notion linked to the preservation of energy across sections of the physical light beams.

Figure 3:
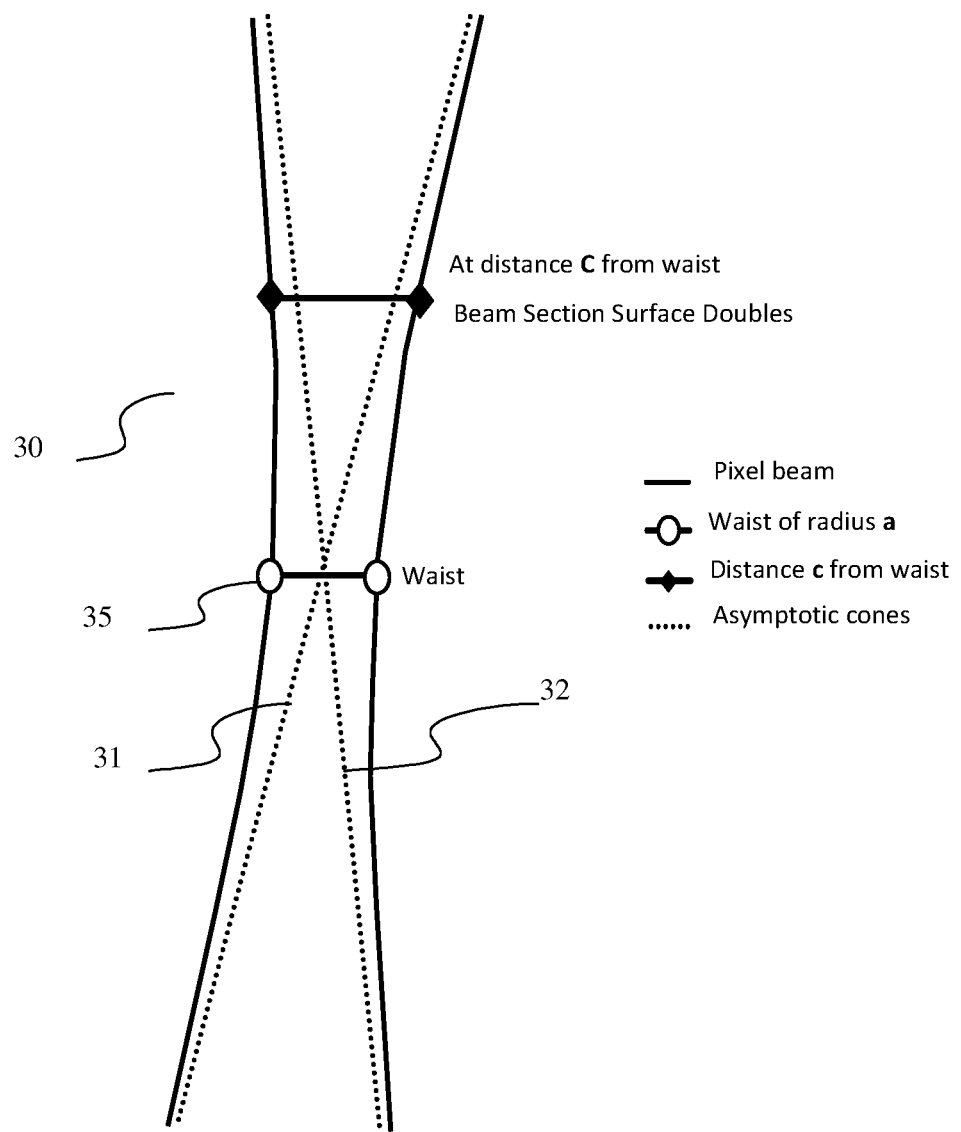
FIG. 3 shows a hyperboloid of one sheet and its asymptotic cones.

As represented on FIG. 3, a hyperboloid of one sheet 30 is mostly identical to its asymptotic cones 31, 32, except in the fundamental region of its smallest section, called the waist 35, which corresponds to the conjugate 15 in the object space. For plenoptic systems, such as light-field cameras, this is the region where space sampling by multiple path rays is performed. Sampling space with unique cones degenerating to a point in this region is not adequate, as pixel 12 sensitivity is significant on some tens of square microns on its surface and cannot be represented by a mathematical point with infinitely small surface as would be a cone tip.

In an embodiment of the invention, each pixel beam 10, 20, 30, is defined by four independent parameters: $z_P$, $\theta_x$, $\theta_y$, a defining the position and size of the pixel conjugate 15, 35, in front of the pupil 14, 24 and by six pupilar parameters $x_O$, $y_O$, $z_O$, $\theta_{x0}$, $\theta_{y0}$, r which define the position, orientation and radius of the pupil 14, 24. These six pupilar parameters are common to the collection of pixel beams, when represented by a hyperboloid of one sheet, sharing a same pupil 14, 24. Indeed, a pixel beam represents the volume occupied by a set of rays of light in the object space of the optical system 11 sensed by the pixel 12 through the pupil 14, i.e. to a given couple pixel 12/pupil 14, 24 corresponds a unique pixel beam 10, 20, 30, but a plurality of distinct pixel beams can be supported by a same pupil 14, 24.

An origin O of a coordinate system (x, y, z) in which the parameters of the hyperboloid of one sheet representing the pixel beam 10, 20, 30 are defined corresponds to the centre of the pupil 14 as shown on FIG. 1, where the z axis defines a direction normal to the surface of the pupil 14, 24.

The parameters $\theta_x$, $\theta_y$, define chief ray directions relative to the entrance of the pupil 14 centre. They depend on the pixel 12 position on the sensor 13 and on the optical elements of the optical system 11. More precisely, the parameters $\theta_x$, $\theta_y$ represent shear angles defining a direction of the conjugate 15 of the pixel 12 from the centre of the pupil 14.

The parameter $z_P$ represents a distance of the waist 35 of the pixel beam 10, 20, 30, or the conjugate 15 of the pixel 12, along the z axis.

The parameter a represents the radius of the waist 35 of the pixel beam 10, 20, 30.

For optical systems 11 where optical distortions and field curvatures may be modelled, the parameters $z_P$ and a can depend on the parameters $\theta_x$ and $\theta_y$ via parametric functions.

The four independent parameters are related to the pixel 12 and its conjugate 15.

The six complementary pupilar parameters defining a pixel beam 10, 20, 30 are:
r which represents the pupil 14, 24 radius,
$x_O$, $y_O$, $z_O$ which represent the coordinates of the pupil 14, 24 center in the (x, y, z) coordinate system, and
$\theta_{x0}$, $\theta_{y0}$ which represent the orientation of the pupil 14, 24 in the reference (x, y, z) coordinate system.

These six pupilar parameters are related to the pupil 14, 24. Another parameter c is defined. Such a parameter c is dependent on the parameters $z_P$ and a related to the pixel 12 and its conjugate 15 and on the parameters r related to the pupil 14, 24. The parameter c defines the angular aperture α of the pixel beam 10, 20, 30 and is given by the formula $$\tan(\alpha) = \frac{a}{c}.$$

Thus, the expression of the parameter c is given by the following equation:

$$c^2 = \frac{a^2 z_P^2}{r^2 - a^2} \quad (1)$$

The coordinates (x, y, z), in the object space, of points belonging to the surface delimiting the pixel beam 10, 20, 30 are function of the above defined sets of parameters related to the pupil 14, and to the conjugate 15 of the pixel. Thus, equation (2) enabling the generation of the hyperboloid of one sheet representing the pixel beam 10, 20, 30 is:

$$\frac{(x - z \cdot \tan(\theta_x))^2}{a^2} + \frac{(y - z \cdot \tan(\theta_y))^2}{a^2} - \frac{(z - z_P)^2}{c^2} = 1 \quad (2)$$

A parametric equation (3) of the same hyperboloid representing the pixel beam 10, 20, 30 is:

$$\begin{cases} x = a\sqrt{1 + \frac{(z - z_P)^2}{c^2}} \cdot \cos(v) + z \cdot \tan(\theta_x) \\ y = a\sqrt{1 + \frac{(z - z_P)^2}{c^2}} \cdot \sin(v) + z \cdot \tan(\theta_y) \end{cases} \quad (3)$$

wherein v is an angle in the (x, y) plane enabling the generation of the pixel beam 10, 20, 30 from a generating hyperbola, v varies in [0, 2π] interval, and z∈ [0, ∞] is the coordinate along the z axis which defines a direction normal to the surface of the pupil 14, 24. Equations (2) and (3) are written on the assumption that the section of the pixel 12 and its conjugate 15 are circular and that the section of the pupil 14, 24 is circular as well.

Information related to a correspondence between pixels of a sensor of said optical acquisition system and an object space of said optical acquisition system may take the form of either a set of parameters comprising the four independent parameters: $z_P$, $\theta_x$, $\theta_y$, a defining the position and size of the pixel conjugate 15, 35, in front of the pupil 14, 24 and the six pupilar parameters $x_O$, $y_O$, $z_O$, $\theta_{x0}$, $\theta_{y0}$, r which define the position, orientation and radius of the pupil 14, 24 when the pixel beam is to be represented by its parametric equation.

Thus, this set of parameters is provided in addition to raw images or epipolar images representing 4D light-field data captured by the optical acquisition system in order to be used while processing the 4D light-field data.

Figure 4:
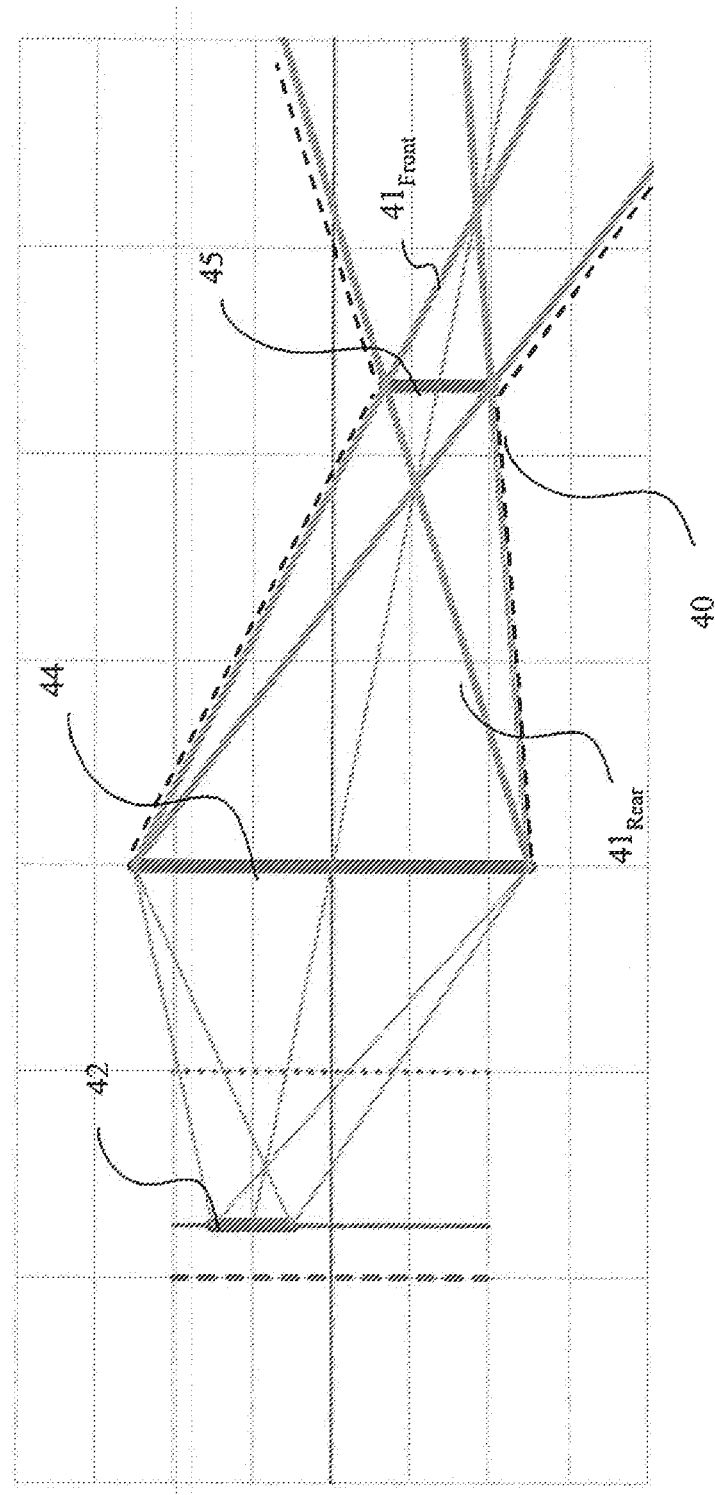
FIG. 4 shows a pixel beam represented by two coaxial, partially overlapping cones according to an embodiment of the invention.

In a second embodiment of the invention, a pixel beam 40 may be represented by two coaxial, partially overlapping cones a front cone $41_F$ and a rear cone $41_R$ as shown on FIG. 4, supported by two elements: the pupil 44 and the conjugate 45 of the pixel 42 in the object space, i.e. the surface in the object space that is imaged on the pixel.

The front cone $41_F$ is the image of a convex frustum defined by the pixel 42 and the pupil 44. The apex of the convex frustum lies beyond the sensor of the optical acquisition system. By construction, the front cone $41_F$ is converging in the object space of the optical acquisition system and the apex of the front cone $41_F$ lies between the conjugate of the pixel 45, or the waist of the pixel beam 40, and the pupil 44. The front cone $41_F$ derives from the solid angle subtended by the pupil 44 at the pixel 42.

The rear cone $41_R$ is the image of a cone defined by the pixel 42 and the pupil 44, the apex of which lies between the pupil 44 and the sensor of the optical acquisition system. By construction, the apex of the rear cone $41_R$ is located beyond the waist 45 of the pupil 40. The rear cone $41_R$ does not necessarily converge in the object space of the optical acquisition system, in some cases, it may degenerate into a cylinder or a diverging cone. In the latter case, the apex of the diverging cone lies in the image space of the optical acquisition system, i.e. before the entrance of the pupil 44.

The front cone $41_F$ and the rear cone $41_R$ share the same revolution axis, which is a line joining the centre of the pupil 44 and the centre of the waist 45.

Cones are ruled surfaces that can support the notion of pencil of rays of light and when combining two cones is compatible with the notion of "étendue" of physical light beams, notion linked to the preservation of energy across sections of the physical light beams. Intersections of cones with planes are conic curves, as for hyperboloids, which can be characterized by a plurality of coefficients. Considering its apex, a cone may be represented by three angular parameters: a polar angle measured from the revolution axis of the cone, up to the apex angle and the direction of the revolution axis given by two angles.

Let xyz be the coordinate system of the optical acquisition system, z denoting the optical axis of the optical acquisition system with z>0 in the object space of the optical acquisition system and the centre of the pupil 44 being the origin of said coordinate system.

The optics of the optical acquisition system images the object space of the optical acquisition system from the range z∈[2f; +∞] into the image space of the optical acquisition system z∈[−2f; −f], where f is the focal length of the optics of the optical acquisition system. The location of the pupil 44 and the waist 45 of the pixel beam 40 are known in the coordinate system xyz of the optical acquisition system from the calibration of the optical acquisition system. The pupil 44 and the waist 45 are assumed to be parallel and are both normal to the z axis.

Let us call z' the chief ray of the pixel beam 40. The chief ray is the line joining the centre of the pupil 44 and the centre of the waist 45 of the pixel beam 40. The chief ray is also the revolution axis and the axis of symmetry of the pixel beam 40. Thus, in the coordinate system xyz', the pixel beam 40 is a solid of revolution.

Both the apices of the front cone $41_F$ and the rear cone $41_R$ are located on the chief ray z' of the pixel beam 40. Under the thin lens approximation, the coordinates of these two apices are computed in the coordinate system xyz of the optical acquisition system as follow, under the assumption that the sensor of the optical acquisition system is not located the rear focal plane:

$$\begin{cases} \frac{z_W - z_{front}}{W} = \frac{z_{front} - z_P}{P} \\ \frac{z_{rear} - z_W}{W} = \frac{z_{rear} - z_P}{P} \end{cases} \quad (4)$$

i.e.:

$$\begin{cases} z_{front} = \frac{P \cdot z_W + W \cdot z_P}{P + W} \\ z_{rear} = \frac{P \cdot z_W + W \cdot z_P}{P - W} \end{cases} \quad (5)$$

where P, $z_P$, W and $z_w$ respectively denote the diameter of the pupil 44 with P>0, its z-coordinate, the diameter of the pixel's conjugate 45 with 0<W<+∞, and its z-coordinate 0<$z_w$<+∞.

The z-coordinate $z_{rear}$ of the apex of the rear cone $41_R$ may be positive, when the rear cone $41_R$ is a converging cone, negative, when the rear cone $41_R$ is a diverging cone. It may also be infinite if the pupil 44 and the pixel's conjugate 45 of the pixel beam are of the same size.

If the sensor of the optical acquisition system is located on the rear focal plane, then W=+∞ and $z_w$=+∞. As their ratio is a constant:

$$\frac{1}{z_{front} - z_P} = \frac{p}{P \cdot f} = \frac{1}{z_P - z_{rear}} \quad (6)$$

where p and f respectively represent the diameter of the pixel 42 with p>0 and the focal length of the optics of the optical acquisition system with f>0 assuming the optics of the optical acquisition system is a converging lens.

The apex angles are given by:

$$\begin{cases} \tan \theta_{front} = \dfrac{W/2}{|z_{front} - z_w|} \\ \tan \theta_{rear} = \dfrac{W/2}{|z_{rear} - z_w|} \end{cases} \quad (7)$$

Considering the apex of each cones, which union represents a pixel beam 40, rays can be defined with two angular parameters: the polar angle measure from the revolution axis of the pixel beam, up to the apex angle, and an azimuth in [0,2π[.

The information related to pixel beams are metadata associated to a given optical acquisition system. They may be provided as a data file stored for example on a CD-ROM or a flash drive supplied with the optical acquisition system. The data file containing the additional information related to pixel beams may also be downloaded from a server belonging to the manufacturer of the optical acquisition system. In an embodiment of the invention, these additional information related to pixel beams may also be embedded in a header of the images captured by the optical acquisition system.

The knowledge of these information related to pixel beams enables the processing of images captured by any optical acquisition system independently of the proprietary file format and of the features of the optical acquisition system used to capture the images to be processed.

The knowledge of information related to pixel beams enables the processing of images captured by any optical acquisition system independently of the proprietary file format and of the features of the optical acquisition system used to capture the images to be processed.

Figure 5:
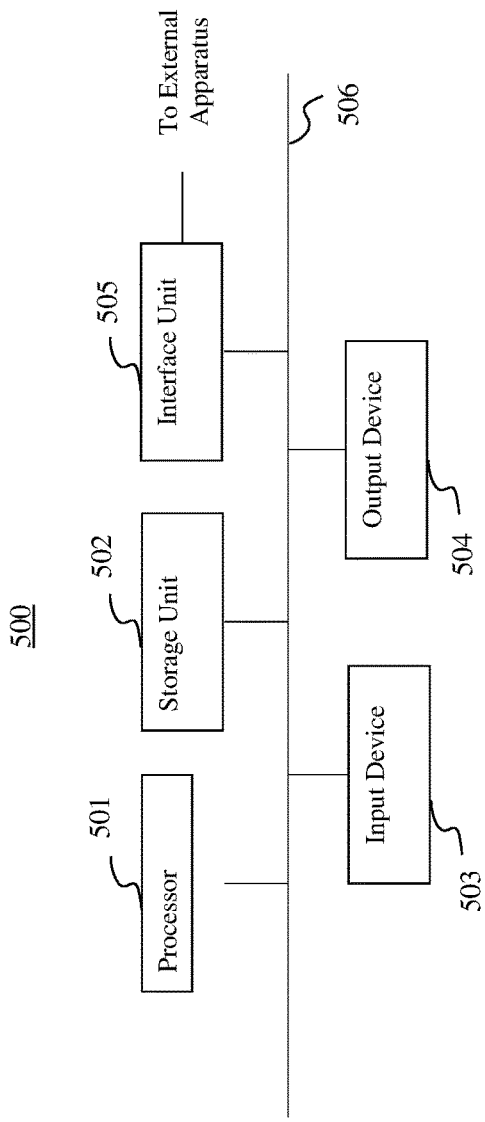
FIG. 5 is a schematic block diagram illustrating an example of an apparatus for generating data representative of a bokeh associated to a pixel beam according to an embodiment of the invention.

FIG. 5 is a schematic block diagram illustrating an example of an apparatus for generating data representative of a bokeh associated to a pixel beams according to an embodiment of the present disclosure.

The apparatus 500 comprises a processor 501, a storage unit 502, an input device 503, a display device 504, and an interface unit 505 which are connected by a bus 506. Of course, constituent elements of the computer apparatus 500 may be connected by a connection other than a bus connection.

The processor 501 controls operations of the apparatus 500. The storage unit 502 stores at least one program capable of generating data representative of pixel beams representing the object space of a first optical system when these pixel beams are imaged through a second optical system to be executed by the processor 501, and various data, including parameters related to a position of the pixel 12 on the sensor 13 or parameters related to the first optical system 11 of the optical acquisition system and a second optical system, parameters used by computations performed by the processor 501, intermediate data of computations performed by the processor 501, and so on. The processor 501 may be formed by any known and suitable hardware, or software, or a combination of hardware and software. For example, the processor 501 may be formed by dedicated hardware such as a processing circuit, or by a programmable processing unit such as a CPU (Central Processing Unit) that executes a program stored in a memory thereof.

The storage unit 502 may be formed by any suitable storage or means capable of storing the program, data, or the like in a computer-readable manner. Examples of the storage unit 502 include non-transitory computer-readable storage media such as semiconductor memory devices, and magnetic, optical, or magneto-optical recording media loaded into a read and write unit. The program causes the processor 501 to perform a process for computing data representative of the pixel beams of a collection of pixel beams representative of the object space of a first optical system from an image conjugate of said pixel beam through a second optical system beam according to an embodiment of the present disclosure as described hereinafter with reference to FIG. 6.

The input device 503 may be formed by a keyboard, a pointing device such as a mouse, or the like for use by the user to input commands, to make user's selections of parameters used for generating a parametric representation of a volume occupied by a set of rays of light in an object space of an optical system. The output device 604 may be formed by a display device to display, for example, a Graphical User Interface (GUI), images generated according to an embodiment of the present disclosure. The input device 503 and the output device 504 may be formed integrally by a touch-screen panel, for example.

The interface unit 505 provides an interface between the apparatus 500 and an external apparatus. The interface unit 505 may be communicable with the external apparatus via cable or wireless communication. In an embodiment, the external apparatus may be an optical acquisition system such as an actual camera.

Figure 6:
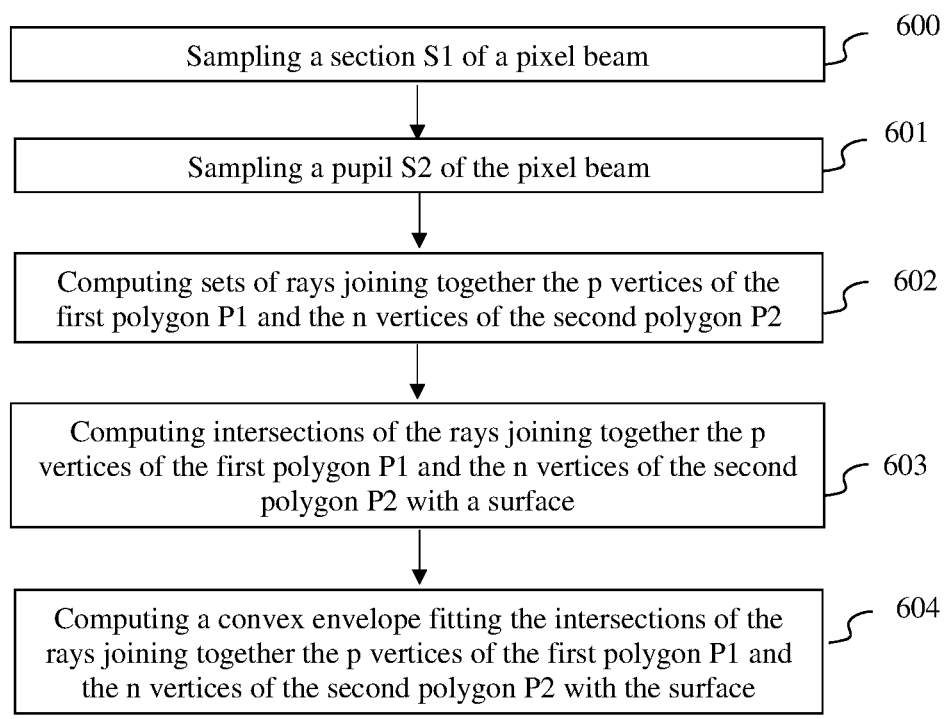
FIG. 6 is a flow chart for explaining a process for generating data representative of a bokeh associated to a pixel beam according to an embodiment of the disclosure.

FIG. 6 is a flow chart for explaining a process for generating data representative of a bokeh associated to a pixel beams according embodiments of the invention.

Out-of-focus parts of an image produced by a lens are blurred. The aesthetic quality of such a blur is called a bokeh, which may be defined as "the way the lens renders out-of-focus points of light". Differences in lens aberrations and aperture shape cause some lens designs to blur the image in a way that is pleasing to the eye, while others produce blurring that is unpleasant or distracting.

When rendering an image or a video from a light-field content, it would be interesting to display an image as close as possible as a conventional image or video in terms of blur aesthetics, i.e. to display an image with good bokeh properties.

A light field content may be sampled by a collection of pixel beams defining the object space of an optical system. Embodiments of the invention are not limited to light-field contents directly acquired by an optical device. These contents may be Computer Graphics Image (CGI) that are totally or partially simulated by a computer for a given scene description. Another source of light-field contents may be post-produced data that are modified, for instance color graded, light-field contents obtained from an optical device or CGI. It is also now common in the movie industry to have data that are a mix of both data acquired using an optical acquisition device, and CGI data. It is to be understood that the pixels of a sensor can be simulated by a computer-generated scene system and, by extension, the whole sensor can be simulated by said system. From here, it is understood that any reference to a "pixel of a sensor" or a "sensor" can be either a physical object attached to an optical acquisition device or a simulated entity obtained by a computer-generated scene system.

Figure 7C:
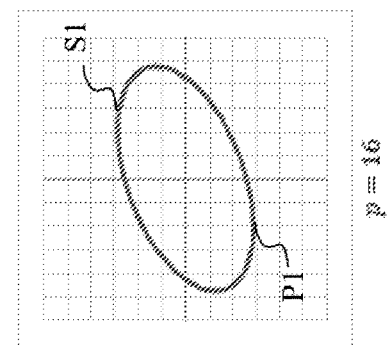
FIGS. 7A-7C represent sections of a pixel beam sampled by polygons according to an embodiment of the invention.
Figure 7B:
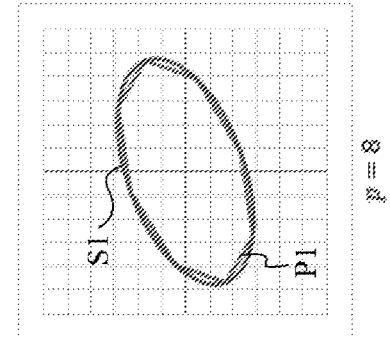
Figure 7A:
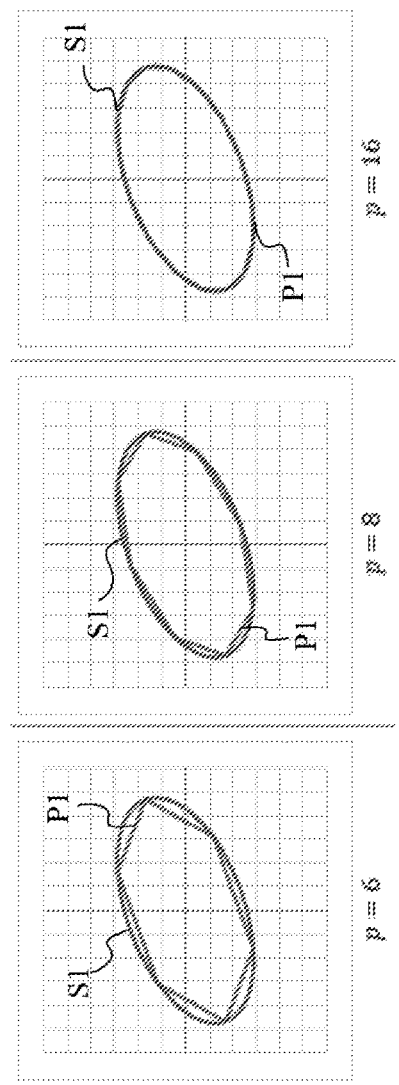

In a step 600, the processor 501 of the apparatus 500 samples a section S1 of a pixel beam 10, 20, 30, 40, 92 of the collection of pixel beams representing a light filed content as a first polygon P1 having p vertices. The section S1 may be a circle, an ellipse, a square, etc. The section S1 and examples of polygon P1 are represented on FIGS. 7A-7C. On FIG. 7A, the polygon P1 sampling the section S1 of the pixel beam 10, 20, 30, 40, 92 has 6 vertices. On FIG. 7B, the polygon P1 sampling the section S1 of the pixel beam 10, 20, 30, 40, 92 has 8 vertices. On FIG. 7A, the polygon P1 sampling the section S1 of the pixel beam 10, 20, 30, 40, 92 has 16 vertices and can almost merge with the section S1 of the pixel beam 10, 20, 30, 40, 92.

In a step 602, the processor 501 of the apparatus 500 samples a pupil S2 of the pixel beam 10, 20, 30, 40, 92 of the collection of pixel beams representing a light filed content as a second polygon P2 having n vertices. The section S1 may be a circle, an ellipse, a square, etc. The pupil S2 and examples of polygon P2 are represented on FIGS. 8A-8F. On FIG. 8A, the polygon P2 sampling pupil S2 of the pixel beam 10, 20, 30, 40, 92 has 4 vertices. On FIG. 8A, the polygon P2 sampling pupil S2 of the pixel beam 10, 20, 30, 40, 92 has 4 vertices. On FIG. 8B, the polygon P2 sampling pupil S2 of the pixel beam 10, 20, 30, 40, 92 has 5 vertices. On FIG. 8C, the polygon P2 sampling pupil S2 of the pixel beam 10, 20, 30, 40, 92 has 6 vertices. On FIG. 8D, the polygon P2 sampling pupil S2 of the pixel beam 10, 20, 30, 40 has 8 vertices. On FIG. 8E, the polygon P2 sampling pupil S2 of the pixel beam 10, 20, 30, 40, 92 has 12 vertices. On FIG. 8F, the polygon P2 sampling pupil S2 of the pixel beam 10, 20, 30, 40, 92 has 16 vertices and can almost merge with the pupil S2 of the pixel beam 10, 20, 30, 40, 92.

It appears that the complexity of the method according to an embodiment of the invention increases linearly with the numbers of vertices of the first polygon P1 and the second polygon P2. Multiples of four are preferred for p and n for alignment issues in the storage unit 502 and the processor 501 of the apparatus 500 during processing. The number of vertices of the polygons P1 and P2 may be chosen by a user of the apparatus 500 and provided to said apparatus 500 as parameters to be used to generate data representative of the bokeh through the input device 503 of the apparatus 500.

In a first embodiment of the method for generating data representative of a bokeh associated to a pixel beam, the considered pixel beams 10, 20, 30, 40 belong to a collection of pixel beams representative of the object space of an optical system (not shown on the figures). In this first embodiment, the section S1 of the pixel beam 10, 20, 30, 40 corresponds to the conjugate of the pixel 15, 25, 35, 45; the pupil S2 is an entrance pupil and corresponds to the pupil 14, 24 and 44.

In a second embodiment of the method for generating data representative of a bokeh associated to a pixel beam, the considered pixel beams 92 are conjugates of pixel beams 10, 20, 30, 40 belonging to a collection of pixel beams representative of the object space of a first optical system (not shown on the figures) through a second optical system 91 as represented on FIG. 9. In the following example, the pixel beams 10, 20, 30, 40, 92 are represented by a hyperboloid of one sheet. In this second embodiment, the section S1 of the pixel beam 92 corresponds to a conjugate, through the second optical system 91, of an intersection of a given pixel beam 10, 20, 30, 40 with a plane; the pupil S2 corresponds to an exit pupil of the second optical system 91.

Back top FIG. 6, in a step 603, the processor 501 of the apparatus 500 computes sets of rays joining together the p vertices of the first polygon P1 and the n vertices of the second polygon P2.

In the case of pixel beams 10, 20, 30, 40 located in the object space of the optical system, which corresponds to the first embodiment of the method for generating data representative of a bokeh associated to a pixel beam, there are p multiplied by n rays joining the vertices of the first polygon P1 with the vertices of the second polygon P2.

In the case of pixel beams 92, or image pixel beams; which corresponds to the second embodiment of the method for generating data representative of a bokeh associated to a pixel beam, and more specifically in the case where the pixel beam 10, 20, 30, 40, 92 corresponds to a union of two overlapping cones, there are n multiplied by 2p rays joining the vertices of the first polygon P1 with the vertices of the second polygon P2.

In a step 604, the processor 501 computes intersections of the rays joining together the p vertices of the first polygon P1 and the n vertices of the second polygon P2 with a surface.

In the first embodiment of the method for generating data representative of a bokeh associated to a pixel beam, the surface corresponds to a focus plane of the optical system.

In the second embodiment of the method for generating data representative of a bokeh associated to a pixel beam, the surface corresponds to the sensor associated to the second optical system 91.

More generally, the surface may correspond either to a focus plane when a computation of a section of a pixel beam is at stake, or to the sensor when imaging a section of a pixel beam in a camera.

In a step 605, the processor 501 of the apparatus 500 computes a convex envelope fitting the intersections of the rays joining together the p vertices of the first polygon P1 and the n vertices of the second polygon P2 with the surface. The convex envelope corresponds to the bokeh associated with a pixel beam 10, 20, 30, 40, 92. The parameters representative of the convex envelope computed during step 605 may be stored in the storing unit 502 of the apparatus 500 for further uses such as rendering the light filed content sampled by the collection of pixel beams for which data related to bokeh have been computed. The more intersections the more aesthetic the bokeh.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method comprising:
   receiving optical data associated with a volume in an object space for a set of rays of light passing through a pupil of an optical system and a conjugate;
   obtaining a set of intersections of rays joining vertices of a first polygon representing a sampling of a section of the pixel beam to vertices of a second polygon representing a sampling of the pupil with a first surface,
   obtaining a convex envelope corresponding to the bokeh associated with said pixel beam by fitting said set of intersections
   generating data representative of the bokeh associated with a volume in the object space for the pixel beam corresponding to the convex envelope of the set of intersections.

2. The method according to claim 1 wherein the section of the pixel beam corresponds to the conjugate of a pixel of the sensor, the pupil corresponds to an entrance pupil of the optical system and the first surface corresponds to a focus plane of said optical system.

3. A device for rendering a bokeh associated to associated to a volume in an object space of an optical system occupied by a set of rays of light passing through a pupil of said optical system and a conjugate, in said object space of the optical system, of at least one pixel of a sensor associated to said optical system, said volume occupied by said set of rays of light being called a pixel beam using obtained in accordance with the method of claim 2.

4. The method according to claim 1 wherein the section of the pixel beam corresponds to a conjugate, through another optical system, of an intersection of said pixel beam with a plane, the pupil corresponds to an exit pupil of the optical system and the first surface corresponds to the sensor associated to the optical system.

5. A device for rendering a bokeh associated to associated to a volume in an object space of an optical system occupied by a set of rays of light passing through a pupil of said optical system and a conjugate, in said object space of the optical system, of at least one pixel of a sensor associated to said optical system, said volume occupied by said set of rays of light being called a pixel beam using obtained in accordance with the method of claim 4.

6. The method according to claim 1 claims wherein the first polygon comprising p vertices and the second polygon comprising n vertices, the number of rays joining the p vertices of the first polygon to the n vertices of the second polygon is a multiple of the product of n by p.

7. A device for rendering a bokeh associated to associated to a volume in an object space of an optical system occupied by a set of rays of light passing through a pupil of said optical system and a conjugate, in said object space of the optical system, of at least one pixel of a sensor associated to said optical system, said volume occupied by said set of rays of light being called a pixel beam using obtained in accordance with the method of claim 6.

8. A device for rendering a bokeh associated to associated to a volume in an object space of an optical system by a set of rays of light passing through a pupil of said optical system and a conjugate, in said object space of the optical system, of at least one pixel of a sensor associated to said optical system, said volume occupied by said set of rays of light being called a pixel beam using obtained in accordance with the method of claim 1.

9. A non-transitory storage medium carrying instructions of program code for executing the method for generating data representative of a bokeh according to claim 1, when said program is executed on a computing device.

10. An apparatus for generating data, said apparatus comprising a processor configured to:
    receive optical data associated with a volume in an object space for a set of rays of light passing through a pupil of an optical system and a conjugate;
    obtain a set of intersections of rays joining vertices of a first polygon representing a sampling of a section of the pixel beam to vertices of a second polygon representing a sampling of the pupil with a first surface,
    obtain a convex envelope corresponding to the bokeh associated with said pixel beam by fitting said set of intersections
    generate data representative of the bokeh associated with a volume in the object space for the pixel beam corresponding to the convex envelope of the] set of intersections.

11. The apparatus according to claim 10 wherein the section of the pixel beam corresponds to the conjugate of a pixel of the sensor, the pupil corresponds to an entrance pupil of the optical system and the first surface corresponds to a focus plane of said optical system.

12. The apparatus according to claim 10 wherein the section of the pixel beam corresponds to a conjugate, through another optical system, of an intersection of said pixel beam with a plane, the pupil corresponds to an exit pupil of the optical system and the first surface corresponds to the sensor associated to the optical system.

13. The apparatus according to claim 10 wherein the first polygon comprising p vertices and the second polygon comprising n vertices, the number of rays joining the p vertices of the first polygon to the n vertices of the second polygon is a multiple of the product of n by p.

* * * * *

UNITED STATES PATENT AND TRADEMARK OFFICE
CERTIFICATE OF CORRECTION

PATENT NO. : 10,475,163 B2  
APPLICATION NO. : 15/683207  
DATED : November 12, 2019  
INVENTOR(S) : Guillaume Boisson, Laurent Blonde and Benoit Vandame Page 1 of 1

It is certified that error appears in the above-identified patent and that said Letters Patent is hereby corrected as shown below:

In the Claims

At Column 13, Lines 26-27, Claim 3, delete "associated to associated to" and insert --associated to--

At Column 13, Lines 41-42, Claim 5, delete "associated to associated to" and insert --associated to--

At Column 13, Line 49, in Claim 6, after "claim 1" delete "claims"

At Column 14, Lines 1-2, Claim 7, delete "associated to associated to" and insert --associated to--

At Column 14, Lines 9-10, Claim 8, delete "associated to associated to" and insert --associated to--

Signed and Sealed this  
Twenty-sixth Day of December, 2023

Katherine Kelly Vidal  
*Director of the United States Patent and Trademark Office*